June 22, 1965   E. G. KELLER ETAL   3,190,705
SHAFT BEARING LUBRICATING DEVICE
Filed Aug. 24, 1962

INVENTORS
Edwin G. Keller
Kenneth A. Ober
BY
Curtis, Morris & Safford
ATTORNEYS

United States Patent Office 3,190,705
Patented June 22, 1965

3,190,705
SHAFT BEARING LUBRICATING DEVICE
Edwin G. Keller, West Hartford, and Kenneth A. Ober, North Coventry, Conn., assignors to Dunham-Bush, Inc., West Hartford, Conn., a corporation of Connecticut
Filed Aug. 24, 1962, Ser. No. 219,144
4 Claims. (Cl. 308—127)

This invention relates to centrifugal pumps and the like, and more in particular to pumps of the type which are used for circulating water in heating and air conditioning systems.

An object of this invention is to provide an improved pump construction. Another object is to provide an improved shaft support and lubricating system. A further object is to provide an improved motor pump assembly. A still further object is to provide for the above with a construction which is efficient, sturdy, compact, light in weight, free of excessive service requirements, and adaptable to various conditions of operation and use. These and other objects will in part be obvious and in part be pointed out below.

Figure 1:
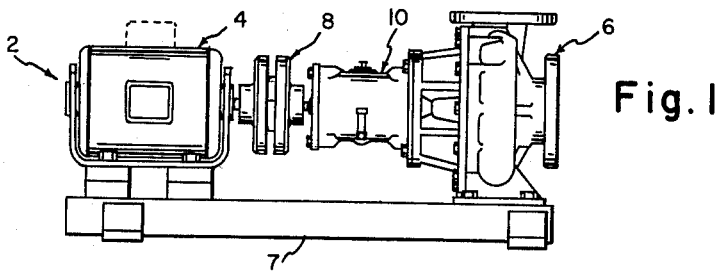
Figure 2:
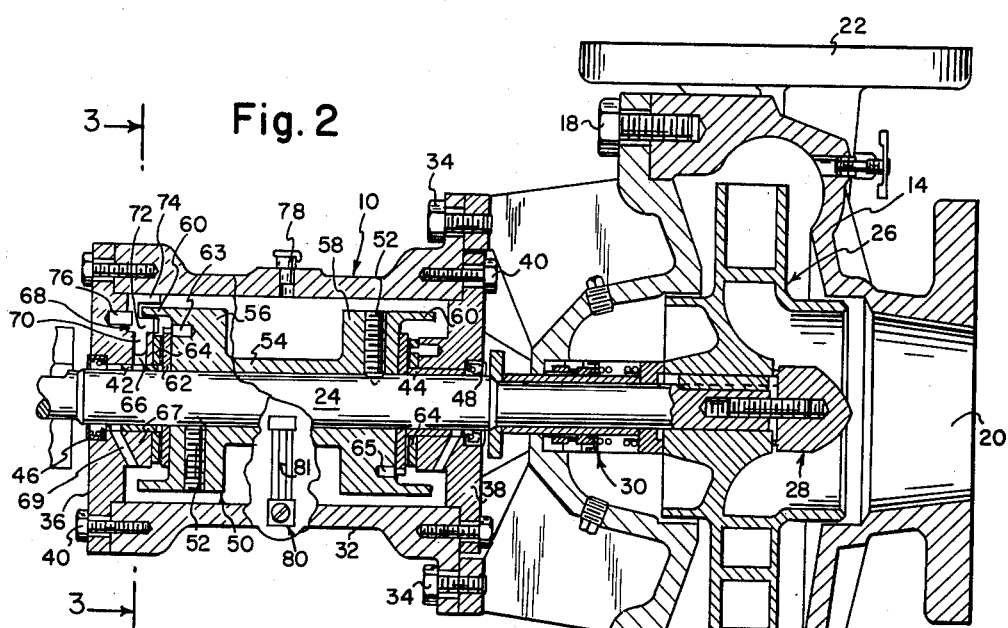
Figure 3:
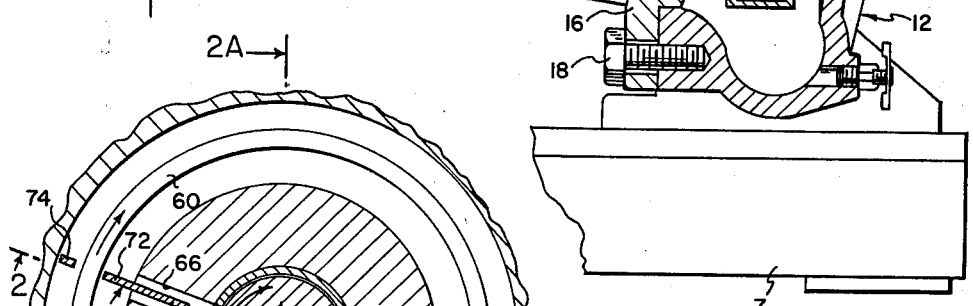

FIGURE 1 is a side elevation of one embodiment of the invention;

FIGURE 2 is the generally vertical section, the left-hand portion being along the line 2—2 of FIGURE 3 and the central and right-hand portions being along the line 2—2A of FIGURE 3; and FIGURE 3 is a sectional view on the line 3—3 of FIGURE 2.

Referring to FIGURE 1, a motor pump unit 2 includes an electrical motor 4 and a centrifugal pump 6, both rigidly mounted together upon a base 7. A flexible coupling 8 connects the driving shaft of the motor to the driven shaft of the pump. As explained in the co-pending application to Kenneth A. Ober, Serial No. 202,754, filed June 15, 1962, a flexible coupling 8 provides efficient and dependable operation even if the shafts of the motor and pumps are somewhat out of alignment. The present invention is concerned with pump 6 and in particular a shaft mounting and lubricating unit 10 forming part of thereof.

Referring to FIGURE 2, pump 6 has a casing 12 which is formed by a main shell 14 and a mating shell 16 clamped together by stud bolts 18. Shell 14 has an axial water inlet connection 20 and a water discharge connection 22. Mounted within casing 12 upon an end of a shaft 24 is a rotor 26 which is keyed to the shaft and clamped thereto by a nut 28. Shaft 24 extends through an axial opening in shell 16, and a shaft seal assembly 30 is positioned between the rotor and the shell wall and prevents leakage from the casing.

Unit 10 is formed by a cylindrical casing 32 which is clamped at its left-hand end to shell 16 by stud bolts 34, and which is closed at its ends by a pair of wall structures 36 and 38, each clamped to the end of casing 32 by stud bolts 40. Shaft 24 is supported by a pair of bearings 42 and 44 supported, respectively, by the wall structures 36 and 38. A pair of shaft seals 46 and 48 are mounted upon shaft 24 adjacent the respective bearings 42 and 48 so that casing 32 is a sealed oil chamber.

Enclosed within casing 32 is an oil circulating rotor 50 which is clamped to shaft 24 by a pair of set screws 52. Rotor 50 is generally cylindrical in overall configuration with a reduced central portion 54 and identical end portions 56 and 58. Each of these end portions is recessed to form a cylindrical flange 60, and a rotating thrust bearing 62 and a stationary bearing 64 are positioned within the recess. Each of the thrust bearings 62 is fixed to rotate with rotor 50 by a plurality of pins 63 mounted on the rotor, and each of bearings 64 is held stationary by a pin 65 in the adjacent wall structure. Each of the wall structures 36 and 38 has a central hub portion 67 projecting into the recess in the end of rotor 50 and enclosing the bearing (42–44).

Each of the hub portions 67 has bore 69 which extends from the left hand end of its bearing (42–44) to the bottom of the hub; this permits oil to drain from the bearing back to the oil sump formed by casing 32. The end face of each of the hub portions 67 holds its bearing 64 against the adjacent bearing 62.

Referring to FIGURE 3, wall structure 36 has a radial bore 66 which extends at an angle of twenty degrees to the horizontal and which is in alignment with a similar bore in bearing 42. Positioned within bore 66 is a flat metal deflector baffle 68. Deflector baffle 68 has a radial portion 70 which is crimped and positioned in bore 66, and two transverse portions 72 and 74 which are positioned respectively at the inner and outer peripheral surfaces of flange 60. Additional support for deflector baffle 68 is provided by a pin 76 which is held by a press fit in a bore in wall structure 36 and which has a slot into which the edge of baffle 68 is held.

As indicated above, casing 32 provides an oil sump to which oil is supplied through an oil inlet fitting 78. An oil gauge 80 indicates the level of the oil within the sump, and this level is maintained at 81 above the bottom portion of flanges 60. During operation, the motor rotates shaft 24 to cause rotor 26 to pump water. Rotor 50 rotates with shaft 24 so that the two flanges 60 pass through the body of oil in the sump of casing 32, and the oil is carried upwardly by the surface of the flanges. These flanges pass through the slots formed by the portions 72 and 74 of the respective deflector baffles 68. Oil clinging to the surface of the flange (see also FIGURE 3) is impelled against portions 72 and 74 of the baffle, and the oil is deflected and flows along the baffle surface downwardly through bore 66 to bearing 42.

The oil passes along bearing 42, some going to the left and back to the sump through bore 69, and some going to the right to the inner peripheries of the thrust bearings 62 and 64. Bearing 64 has radial grooves which permit the oil to move radially outwardly so as to lubricate the bearing surfaces with the excess being discharged at the outer pheripheries of bearings and return to the sump. At the right-hand end (FIGURE 2) of rotor 50 wall structure 38 has a similar deflector baffle and oil passageway constructed which supplies oil to bearing 44 and the adjacent thrust bearings 62 and 64.

It is thus seen that the bearings are all supplied constantly with adequate oil in a dependable and efficient manner. The motor pump unit is adapted to various conditions of operation and use with the size and other specific characteristics being varied to suit the needs. It can be appreciated that the shaft mounting and lubricating unit can be used in many different environments and combination of components.

We claim:

1. In a construction of the character described which includes a substantially horizontal shaft and a pair of bearings which are spaced axially along said shaft with a portion of said shaft between said bearings, an enclosing structure surrounding said shaft and said bearings throughout the axial extent of said bearings, said enclosing structure forming an oil enclosure and sump extending between said bearings, a rotor mounted upon and fixed to said portion of said shaft between said bearings, said rotor having a pair of oppositely disposed annular flanges respectively adjacent said bearings and having a radius such that they pass through oil in said sump during rotation and draw oil above the level of said bearings, the construction including wall structures respectively at said bearings and each being provided with an oil opening extending radially inwardly from the adjacent annular flange to the surface of the shaft at the adjacent bearing whereby oil delivered to said opening flows by gravity to the shaft surface, and a pair of baffles positioned respectively adjacent said flanges and mounted in fixed relationship with respect to and in substantially radially alignment with the adjacent of said oil openings, each of said baffles having a mounting pin which projects axially into the adjacent wall of said enclosure, each of said baffles being substantially flat with a portion positioned in the adjacent oil opening and having portions presenting oil deflecting edges each of which is positioned in spaced relationship with respect to a surface of one of said flanges whereby oil which adheres to said flanges in said sump is deflected therefrom by said baffles, said baffles presenting substantially radial surfaces extending from the respective of said deflecting edges to the adjacent oil opening to provide a flow path for oil deflected from each of said flanges into the adjacent oil opening.

2. A construction as described in claim 1 wherein said enclosing structure comprises a substantially cylindrical casing and end plates mounted thereon and wherein said annular flanges are substantially cylindrical and of slightly lesser diameter than the inner diameter of said cylindrical casing whereby said flanges move in parallel spaced relationship with the adjacent wall portion of said cylindrical casing.

3. A construction as described in claim 1 wherein said rotor comprises a central portion formed by a sleeve surrounding said shaft and a pair of end portions of substantially greater radius each of which presents an outer cylindrical surface and each of said flanges presenting an inner cylindrical surface, each of said baffles including a portion extending along said outer cylindrical surface and another portion extending along its inner cylindrical surface.

4. In a construction of the character described which includes a substantially horizontal shaft, a bearing surrounding said shaft and providing support therefor, an enclosing structure surrounding said shaft and said bearing and forming an oil sump, a rotor mounted upon and fixed to said shaft within said enclosing structure and adjacent said bearing, said rotor having an annular flange adjacent said bearing and having a radius such that it passes through oil in said sump during rotation and draws oil above the level of said bearing, the construction including a wall structure at said bearing having an oil opening which extends downwardly and radially inwardly from an oil-inlet end adjacent said annular flange of said rotor to the surface of said shaft at said bearing whereby oil delivered to said opening flows by gravity to said shaft surface, and a substantially flat baffle positioned at said oil-inlet end of said opening and having an oil deflecting portion with a deflecting edge positioned in spaced relationship with respect to a surface of said flange whereby oil which adheres to said flange in said sump is deflected therefrom by said baffle, said baffle presenting a continuous and substantially radial flow surface extending from said deflecting edge into said oil-inlet end of said opening to provide a flow path for oil deflected from said flange along said baffle and into said opening and thence downwardly and radially inwardly to said shaft surface; said baffle including mounting means supporting it upon the adjacent wall of said enclosing structure.

References Cited by the Examiner

UNITED STATES PATENTS

| 78,895 | 6/68 | Reynolds | 308—127 |
|---|---|---|---|
| 304,548 | 9/84 | Packer | 308—126 |
| 1,136,928 | 4/15 | Bodinson | 103—103 |
| 1,511,861 | 10/24 | Wright | 308—245 |
| 1,704,481 | 3/29 | Lawaczeck | 103—870 |
| 2,648,575 | 8/53 | Anderson | 308—127 |

FOREIGN PATENTS 318,806  6/34  Italy.

ROBERT C. RIORDON, *Primary Examiner.*

FRANK SUSKO, *Examiner.*